(12) United States Patent
Byrnes

(10) Patent No.: US 8,869,237 B2
(45) Date of Patent: *Oct. 21, 2014

(54) METHOD AND SYSTEM FOR PROPAGATING NETWORK POLICY

(71) Applicant: Threatstop, Inc., San Marcos, CA (US)

(72) Inventor: Tomas L. Byrnes, San Marcos, CA (US)

(73) Assignee: ThreatSTOP, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,588

(22) Filed: Aug. 5, 2013

(65) Prior Publication Data

US 2014/0047500 A1  Feb. 13, 2014

Related U.S. Application Data

(63) Continuation of application No. 11/844,264, filed on Aug. 23, 2007, now Pat. No. 8,533,822.

(60) Provisional application No. 60/823,364, filed on Aug. 23, 2006.

(51) Int. Cl.
*H04L 29/06* (2006.01)
*G06F 12/14* (2006.01)
*G06F 21/50* (2013.01)
*G06F 21/60* (2013.01)

(52) U.S. Cl.
CPC .............. *H04L 63/20* (2013.01); *G06F 21/50* (2013.01); *G06F 21/60* (2013.01); *H04L 63/0227* (2013.01); *H04L 63/0236* (2013.01); *H04L 63/0263* (2013.01)
USPC ............... 726/1; 370/395.54; 726/22; 726/27

(58) Field of Classification Search
None
See application file for complete search history.

(56) References Cited

U.S. PATENT DOCUMENTS

| | | | | |
|---|---|---|---|---|
| 7,574,508 | B1 * | 8/2009 | Kommula | 709/226 |
| 7,917,647 | B2 * | 3/2011 | Cooper et al. | 709/233 |
| 8,117,339 | B2 * | 2/2012 | Adelman et al. | 709/245 |
| 2004/0193709 | A1 * | 9/2004 | Selvaggi et al. | 709/224 |
| 2004/0268147 | A1 * | 12/2004 | Wiederin et al. | 713/201 |
| 2006/0242313 | A1 * | 10/2006 | Le et al. | 709/230 |

* cited by examiner

*Primary Examiner* — Fatoumata Traore
(74) *Attorney, Agent, or Firm* — Sheppard Mullin Richter & Hampton LLP

(57) ABSTRACT

A technique for acquiring and disseminating network node characteristics to enable policy decisions including receiving a resolution request from one or more clients in a network environment is disclosed. Information, for example, network address, is then acquired from one or more sources regarding a specific location in a network, for example, a network node. A list of the network addresses is then generated and ranked based on one or more parameters that merit making traffic handling decisions. The network addresses are then associated with a host name on at least one directory server and then propagated to the one or more clients.

18 Claims, 5 Drawing Sheets

METHOD AND SYSTEM FOR PROPAGATING NETWORK POLICY

RELATED APPLICATION

This application is a continuation of U.S. patent application Ser. No. 11/844,264, filed Aug. 23, 2007, which issued as U.S. Pat. No. 8,533,822 on Sep. 10, 2013, which claims the benefit of priority of U.S. Provisional Patent Application No. 60/823,364 filed Aug. 23, 2006, the entire contents of which are incorporated by reference.

FIELD OF THE INVENTION

At least one embodiment of the present disclosure pertains to network traffic management, and more particularly to network security solutions.

BACKGROUND

The growth in popularity and general acceptance of the internet as a network for commerce and communications has been unprecedented. However, security was not part of the original design of the Web so it is susceptible to security breaches. Further exacerbating the lack of security measures in the original design of the Web, many organizations are aggressively moving applications to the Web that were originally created for an internal network environment. The push to make applications available sometimes outweighs thorough security testing of the applications, and potentially opens the door to unanticipated vulnerabilities being uncovered once the application is available on the Internet. Because of this increased focus on network security, network administrators often spend more effort protecting their networks than on actual network setup and administration.

When you connect your private network to the Internet, you are physically connecting your network to a massive number of unknown networks and all of their users. While such connections open the door to many useful applications and provide great opportunities for information sharing, most private networks contain some information that should not be shared with outside users on the Internet. In addition, not all Internet users are involved in lawful activities. While protecting your information may be your highest priority, protecting the integrity of your network is critical in your ability to protect the information that it contains. A breach in the integrity of your network can be extremely costly in time and effort, and it can open multiple avenues for continued attacks. When considering what to protect within your network, you are concerned with maintaining the integrity of the physical network, your network software, any other network resources, and your reputation. This integrity involves the verifiable identity of computers and users, proper operation of the services that your network provides, and optimal network performance—all of these concerns are important in maintaining a productive network environment.

New tools that probe for system vulnerabilities assist in these efforts, but these tools only point out areas of weakness instead of providing a means to protect networks. Network security solutions, such as firewalls and intrusion detection systems, were designed to meet this threat. These solutions, however, are never a substitute for a sensible tool that recognizes the nature of what its handling and behaves appropriately and can improve the effectiveness of security solutions such as firewalls and intrusion detection systems.

SUMMARY OF THE INVENTION

The systems and methods described herein can utilize Internet Protocol (IP) address resolution to propagate information to devices, for example network devices, capable of making a fully qualified domain name (or host name) resolution request such as a DNS (Domain Name System) resolution request. Devices can be a client, subscriber or a user and the information propagated can be an IP address or subnet associated with a host or domain name. An IP address is a unique address that certain electronic devices use in order to identify and communicate with each other on a computer network utilizing the Internet Protocol standard. The Internet Protocol is an example of a method or protocol by which data is sent from one computer to another on the Internet. Any participating network device including routers, computers, time-servers, printers, Internet fax machines, and some telephones can have their own unique address. IP addresses can appear to be shared by multiple client devices either because they are part of a shared hosting web server environment or because a network address translator (NAT) or proxy server acts as an intermediary agent on behalf of its customers, in which case the real originating IP addresses might be hidden from the server receiving a request. On the Internet, the Domain Name System (DNS) associates various sorts of information with so-called domain names; most importantly, it translates human-readable computer hostnames, e.g. orange.com, into the IP addresses that networking equipment needs for delivering information.

In one embodiment a system collects information from one or more sources regarding the character of a node in a network. The character of the node in the network can be related to the quality of information traffic originating from or terminating to that node in the network. In general terms, a node is an originating or terminating point of information or signal flow in a communications network. A node can also be a device that is connected as part of a computer network. For example, a node may be a computer, personal digital assistant, cell phone, router, switch, or hub. The system may rank information relating to one or more specific locations in a network (e.g. node) into one or more lists, using at least one or more selected metric or parameter. A parameter merits making traffic handling decisions when the list they produce can be used at a client to effectively screen out information traffic based on a formulated rule that utilizes domain names. One parameter may be based on a weighted count of how often a network address or list of network addresses appears on each source. Another parameter may be based on the weight each source places on the network address or list of network addresses, while another parameter may be based on the accuracy of a source or a combination of the various parameters. The one or more lists of IP addresses/subnets are then associated with a host name in one or more directory servers, for example a DNS server. The information associated with a host/domain name is then propagated to devices on the network (e.g. client) in a form that can be used by the devices to make a decision about what to do with traffic originating from, and/or destined to, the specific location in the network. In one example, the system takes a variety of lists of known threat sources, bogon IP addresses and sites that should always be allowed to send traffic, and produces DNS lookups that allow those lists to be used very simply in firewall rules. In another example, the list generated by the system is a list of IP addresses. The IP addresses associated with host/domain names can be provided in response to requests to resolve a pre-selected host/domain name that is associated with a list. The request may be received from any interested party, for example, a client or a subscriber. In response to a request to resolve the pre-selected host/domain name, the system can return at least one IP address associated with the host name.

The term host name, domain name, directory name is used interchangeably throughout this document.

In another embodiment, the system can acquire or receive one or more lists, for example, block lists, from a single or multiple sources. The lists can be in formats including text, HTML, or XML so that they can be conveniently divided and grouped into various categories depending on the character of the information originating from or terminating at each network address. An example of the various categories of lists include attacker, open proxy, open relay, phishing site, spamvertised site and spammer. When people access information that they should not be accessing, or when they attempt to do something undesirable to a network or its resources, we refer to such attempts as attacks. An attack is some action, or attempted action, that you do not want to happen on your network. The source of such an attack to the network will be considered a threat source. The person who performs such an action is called an attacker. Generally, a proxy server allows users within a network group to store and forward internet services such as DNS or web pages so that the bandwidth used by the group is reduced and controlled. With an "open" proxy, however, any user on the Internet is able to use this forwarding service. An open mail relay is an SMTP (e-mail) server configured in such a way that it allows anyone on the Internet to relay (i.e. send) e-mail through it. In computing, phishing is a criminal activity using social engineering techniques. Phishers attempt to fraudulently acquire sensitive information, such as usernames, passwords and credit card details, by masquerading as a trustworthy entity in an electronic communication. Spamvertising is the practice of sending E-mail spam, advertising a website, and spamming is the abuse of electronic messaging systems to indiscriminately send unsolicited bulk messages.

In one embodiment, the system is based on user configuration information, to ensure that the information produced for a specific user is compatible with (based on available memory and/or processing power/load) the specific network elements they will be used with. For example, different domain names can be associated with different size list(s) of IP addresses. A user merely needs to select the correct domain name in formulating rules.

In another embodiment, the system can provide information back to users who submit their logs to the system. The logs can be in the form of ranked and correlated reports showing how their network elements handled traffic based on rules (not just the rules that use the list of IP addresses from the server) and, optionally, how that correlates with known attackers and attacks based on all the block list sources known to the system. Although submitting logs is not required to use the system, doing so however, increases its utility to all users, and provides reporting functions to the user that submits the logs.

The system can be designed to be flexible enough to take in any kind of feed that establishes an IP address of a particular node as a communications partner, rank it, put it in a list, and then disseminate that information via any directory system.

Additional uses for the list of domain names resolved to a list of IP addresses, other than block or forward, are traffic prioritization, traffic redirection, deeper inspection, or other special handling. Another aspect of the described systems and methods is that they can take or create lists of network node addresses that indicate the value or behavioral characteristics of the node or which users requests to treat in a specific manner (e.g., block or forward, etc.), and propagate the network node addresses to user devices through one or more dynamic, machine readable medium via a directory lookup list of nodes that enable a network element (user device) to make a handling decision based on membership in the list.

Other features and advantages of the present invention should be apparent from the following description which illustrates, by way of example, aspects of the invention.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Figure 1:
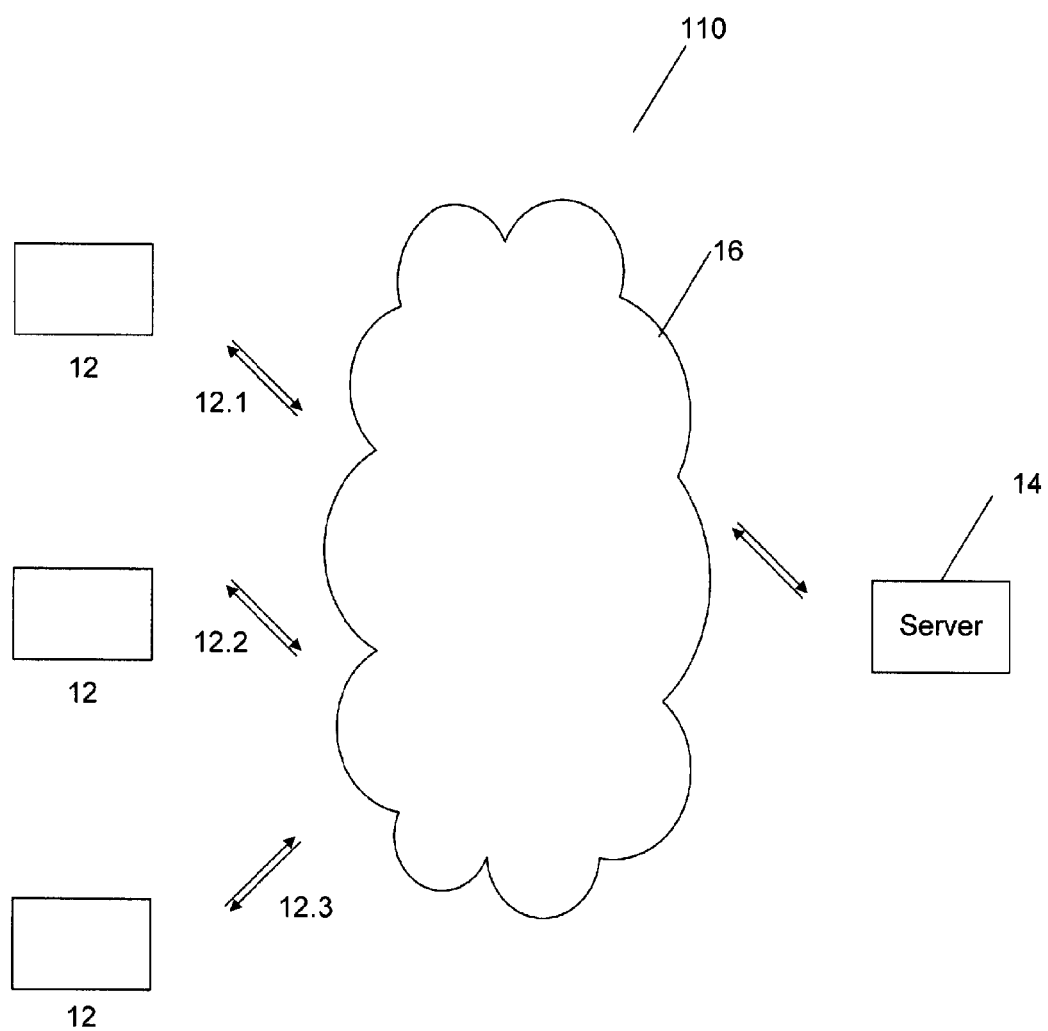
FIG. 1 is a schematic drawing of an exemplary network environment within which embodiments described herein can be implemented.

FIG. 1 is a schematic drawing of an exemplary network environment within which embodiments of the present disclosure can be implemented. Referring to FIG. 1 of the drawings, a network environment within which embodiments of the described technique may be practiced is indicated generally by reference numeral 110. Network environment 110 comprises a number of clients 12 (only a few of which have been shown) each of which is able to communicate with a server 14 via a network 16, for example a wide area network (WAN) or local area network (LAN) using conventional network protocols. A client can be a computer system or process that requests a service of another computer system or process (a "server") using some kind of protocol and accept the server's responses. A client can also be, for example one or more computers, a computer application or software such as a web browser that runs on a user's local computer or workstation and connects to a server as necessary or a combination of both. In addition, a client can be firewalls, switches, routers, servers, and any other system capable of applying a rule. A server can be one or more computers or devices on a network that manages network resources. A server can also refer to one or more programs managing resources rather than the entire computer. The simplest servers are for example switches, routers, gateways, print servers and net modems.

In one embodiment, the network 16 may be the Internet and the communications protocol used may be the Hypertext Transfer Protocol (HTTP). The particular network or the network communications protocols being used are not critical to the present invention. As shown in FIG. 1 of the drawings, client 12 generates requests 12.1 to 12.3 to server 14. Each request 12.1 to 12.4 reaches the server 14 via network 16.

Figure 2:
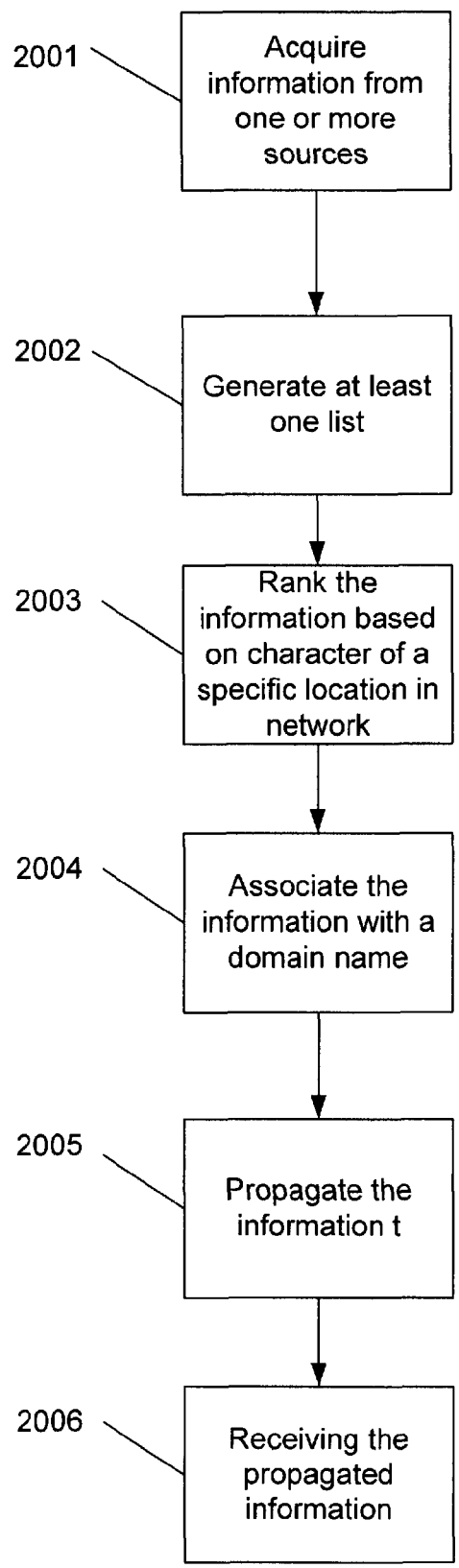
FIG. 2 is a block diagram of an exemplary procedure for gathering and disseminating IP values associated with domain names to enable policy decisions.

FIG. 2 is a block diagram of an exemplary procedure for gathering and disseminating IP values associated with domain names to enable policy decisions. FIG. 2 provides various exemplary operational procedures in accordance with the system for acquiring and disseminating IP values associated with domain names in a network as described above with reference to FIG. 1.

In step 2001, the procedure starts with the server acquiring information relating to at least one specific location in a network from one or more sources. The information acquired can be, for example, an internet protocol address, an internet protocol subnet or any unique information necessary for developing a network policy for screening network traffic. Additionally further information can be acquired regarding the character of at least one specific location in a network. In one embodiment the specific location in the network can be a node and the character of the node in the network can be "good" or "bad" depending on the source of information originating from or terminating at that node. The character of the node in the network can be based on at least one parameter relating to traffic to or from the at least one specific location in the network. In one example, the character of the node can be essential in formulating rules for evaluating network traffic for a network device. The network device can be a client device.

The term IP address, IP subnet or information regarding a specific location in the network is used interchangeably throughout this document. In one embodiment, the process of acquiring information from various sources can be implemented after receiving a resolution request from the network device. Also the process can be manual, automated via software or a combination of both. For example, the process can be automated through software that visits or crawls web pages that are known to list, for example, IP addresses and or IP subnets of spammers. Alternatively, clients, subscribers or volunteers can send in IP addresses and subnets based on the character of the node relating to the addresses and subnets.

One or more lists of the information (e.g. IP address) regarding the at least one specific location in the network is then generated in step 2002. The process then continues to step 2003 where the information (e.g., IP address) regarding the specific locations in the network are ranked into one or more lists based on one or more parameters. The parameters can include a weighted count of how often the information regarding the specific location appears on a list from various sources combined with the weight each source places on the character of the specific location and a weight for the accuracy of each source. These parameters determine, for example, whether a specific location in a network is associated with a known threat source, whether the IP address is from a Bogon source or whether the specific location is associated with a site that should always be allowed to send traffic. In one embodiment the multiple lists are also ranked based on the parameters of the information regarding the specific locations on each list.

In another embodiment, the system receives block lists provided by a number of sources in a format including text, HTML or XML and divides and groups them into types, for example, attacker, Bogon, open proxy, open relay, phishing site, spamvertised site, and spammer. Bogon is an informal name for an IP packet on the public Internet that claims to be from an area of the IP address space reserved, but not yet allocated or delegated.

The process then continues to step 2004 where the information (e.g. IP address) regarding the at least one specific location in the network belonging to a generated list is associated with a host/domain name from at least one directory server, for example, a Domain Name System/Server (DNS) forming an associated list. Additional types of directories of information that can be disseminated are, for example, LDAP (Lightweight Directory Access Protocol), UDDI (Universal Description, Discovery and Integration), YP/NIS (Yellow Pages/Network Information Services) or any other system that provides names to IP addresses (e.g., IPv4 and IPv6) or IP to name mapping. LDAP is an Internet protocol that email and other programs use to look up information from a server. UDDI is an XML-based registry for businesses worldwide to list them on the Internet. Its ultimate goal is to streamline online transactions by enabling companies to find one another on the Web and make their systems interoperable for e-commerce. YP/NIS is a client-server directory service protocol for distributing system configuration data such as user and host names between computers on a computer network. In another embodiment, DNS lookups are produced from a variety of lists including a list of known threat sources, Bogon IP addresses and sites that should always be allowed to send traffic can be used in, for example, firewall rules. This step creates, for example, lists of IP addresses having similar characteristics (e.g., threat sources) under a domain name.

In one embodiment as illustrated in step 2005, information, for example at least one IP address associated with a host/domain name, from the associated list can be propagated to the network device. The information can be sent in a form that enables decision making about traffic originating from and or destined to a specific location in the network. In one embodiment, the propagation can be in response to requests to resolve a pre-selected host name that is associated with a list. In another embodiment, the information can be propagated as Multi-Host A (address mapping) records in private DNS Zones. Given that DNS data is broken up into a hierarchy of domains some servers are responsible to know only a small portion of data, such as a single sub-domain. The portion of a domain for which the server is directly responsible is called a zone. Thus DNS data is divided into manageable sets of data called zones where the zones contain name and IP address information about one or more parts of a DNS domain. A DNS zone database is made up of a collection of resource records. Each resource record specifies information about a particular object. For example, address mapping A (Multi-Host A) records maps a host name to an IP address. The server uses these records to answer queries for hosts in its zone. Users or clients can send address resolution requests for pre-selected host names and receive the information in response as illustrated in Step 2006.

One implementation is to take a specific list (of IP addresses), and to make a single multi-A record lookup for all hosts that are members of that list. These records are then used in step 2006, by, for example, firewalls, switches, routers, servers, and any other system capable of applying a rule where one of the conditions of the rule is a DNS lookup for the Multi-Host A record, to block traffic to and/or from the specified list of IP addresses. Additional embodiments can be used to create the following: white-lists, user-specified zones with filters based on user-specified weights for the character of the sources, protocol specific lists (SMTP, HTTP, etc.), include or exclude filters based on a user's specific business needs (this can be automated through the user uploading their current configuration and having the lists de-conflicted against that), and exploit/vulnerability weighted lists (where the presence of an exploit for a vulnerability and/or attackers that are attacking a user system that may or may not be exploitable by that attack are used to include or exclude particular list elements or reprioritize the lists for the specific user). A White list is a list of IP addresses and domains of trusted e-mail addresses and domains that are always allowed to send email, no matter what the content is. White lists can require that senders authenticate their identity prior to e-mail being delivered to a recipient. All of these types of information (IP addresses associated with a host name) described above can be transmitted to devices as a response to a request to resolve a host name.

Figure 3:
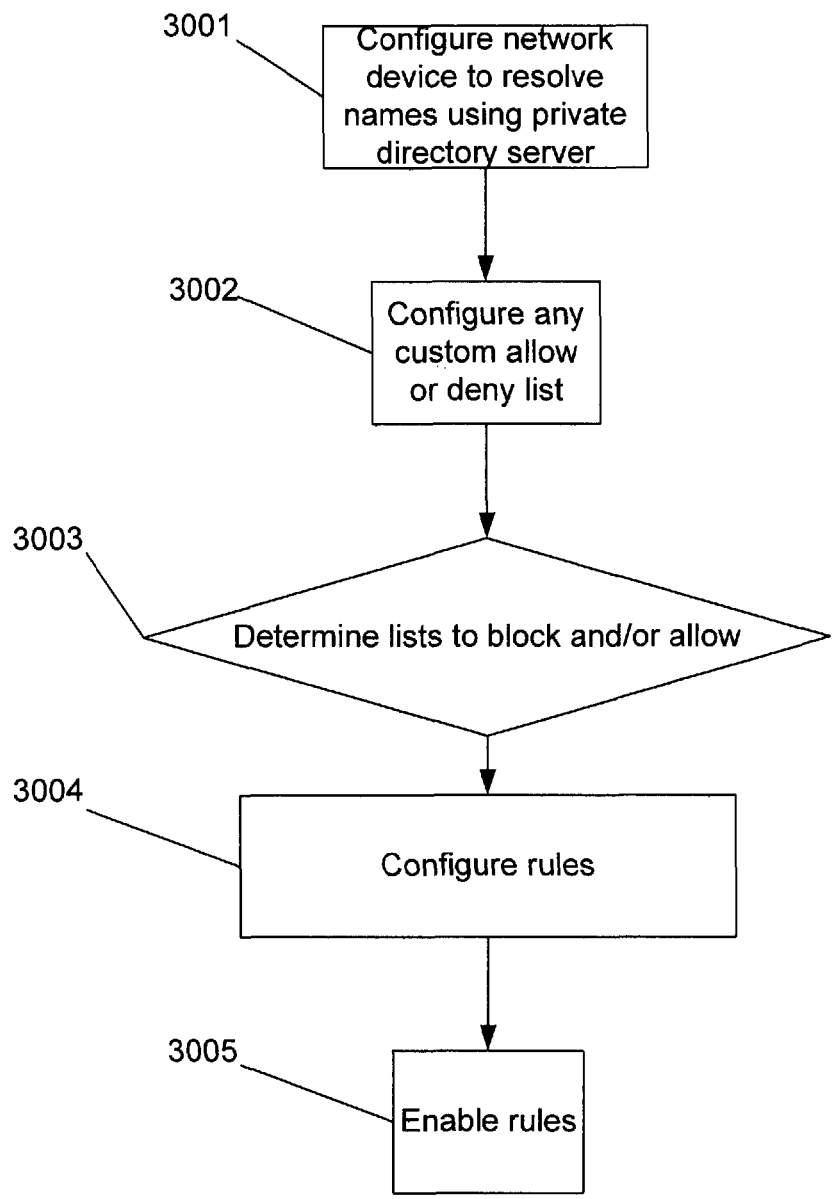
FIG. 3 is a block diagram of an exemplary process for configuring a network device with a server to enable policy decisions.

FIG. 3 is a block diagram of an exemplary process for configuring a network device with a server to enable policy decisions. In step 3001 the procedure starts with a network device or client accessing a server over a network to establish a communications link between the server and the network device. In one embodiment, the server is a private directory server, for example the DISS server made by DISS, in La Jolla, Calif. The network device can be a firewall, or other traffic management device, that can make a forwarding decision based on a DNS lookup. In another embodiment, the network device is configured in accordance with a private directory server in order to establish a communications link. In this case the network device can be configured to resolve names (e.g. domain names) using the private directory service. In yet another embodiment, scripts can be written to configure network devices to resolve domain names using the private directory service. The process then continues to step 3002 where custom allow or deny lists of, for example, domain names associated with a list of IP addresses or IP subnets are configured. Here, custom allow or deny lists are created for the network devices that the network devices can subsequently query against in an implementation utilizing the server. This process can simplify the management of, for example, black and white listing the same IP addresses across multiple devices. Thus a user can, for example, implement a "Deny all except . . . " security policy, or "No matter what, I need to talk to . . . " security policy (with the blanks filled in with a domain name) without implementing the policy on each individual network device. In step 3003, a decision is made to determine the lists of domain names to block and or allow. The process then continues to step 3004 where rules to be implemented at the network device are formulated using domain names that determine the outcome of information originating or terminating at IP addresses associated with the domain names in the rules. Thus, for example, attack sources can be blocked, connections to and from compromised hosts can be blocked and "Trojaned machines" cannot connect back to their "botmasters" that are on the lookup lists.

A Trojan is a program that installs malicious software while under the guise of doing something else. Trojans are more notorious for installing backdoor programs that allow unauthorized remote access to the victim's machine by unwanted parties—normally with malicious intentions. A bot may be a software program designed to do a specific task such as gathering a listing of web sites with the latest news. A botmaster is a Term used to describe an entity that is responsible for and/or maintains a bot.

A simple example, to block the top 10 current attackers according to, for example, Dshield, is a firewall rule of the form:
   FROM <list to block> TO ANY DENY
   FROM ANY TO <list to block> DENY
   Or
   FROM <list to allow> TO ANY ALLOW
   FROM ANY TO <list to allow> ALLOW After the rules are formulated the rules are then ready in the final step 3005 to be enabled, for example, by evaluating against the rule as illustrated in the description of FIG. 4 below.

Figure 4:
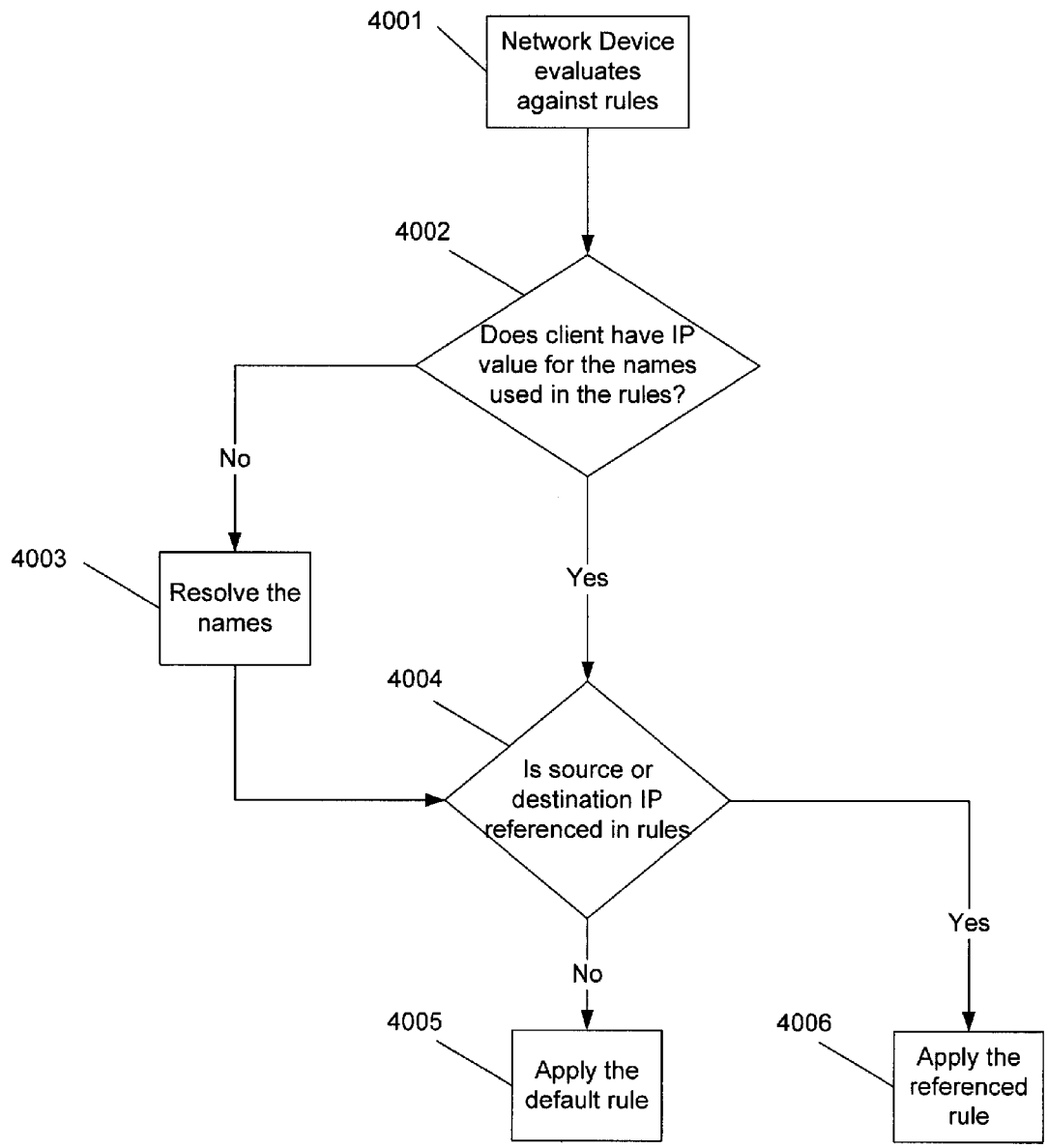
FIG. 4 is a block diagram of an exemplary procedure for evaluating the rules to be implemented in a network device.

FIG. 4 is a block diagram of an exemplary procedure for evaluating the rules to be implemented in a network device. In one embodiment, the rules are formulated at a server and installed at the network device. This procedure is initiated in step 4001 when a rule is applied. A decision is then made in step 4002 to determine whether IP values for the domain names used in the formulated rules are available. If the IP value for the domain names used in the formulated rules is available, an evaluation is made in step 4004 to determine whether the source or destination of the IP value is referenced in the rules. If the source or destination of the IP value is referenced in the formulated rules, then in step 4006 the formulated rules are applied, otherwise a default rule is applied in step 4005.

Alternatively if in step 4002 it is determined that the IP value for the names used in the rules is unavailable, a directory query for domain name resolution is sent to a directory server in step 4003. The response to the query provides the IP addresses. The process then continues to step 4004 where an evaluation is made to determine whether the source or destination of the IP value is referenced in the formulated rules which now include the list of IP addresses. The process then continues to step 4005 and 4006 as previously described. The enabling process can occur automatically, for example, when the first packet is received that triggers the evaluation of the rule. Alternatively the process of enabling the formulated rules can occur on either the expiration of the record time to live (TTL), as configured by the server or some locally defined refresh timer or rule (such as when it ages resolved IPs to free memory).

Figure 5:
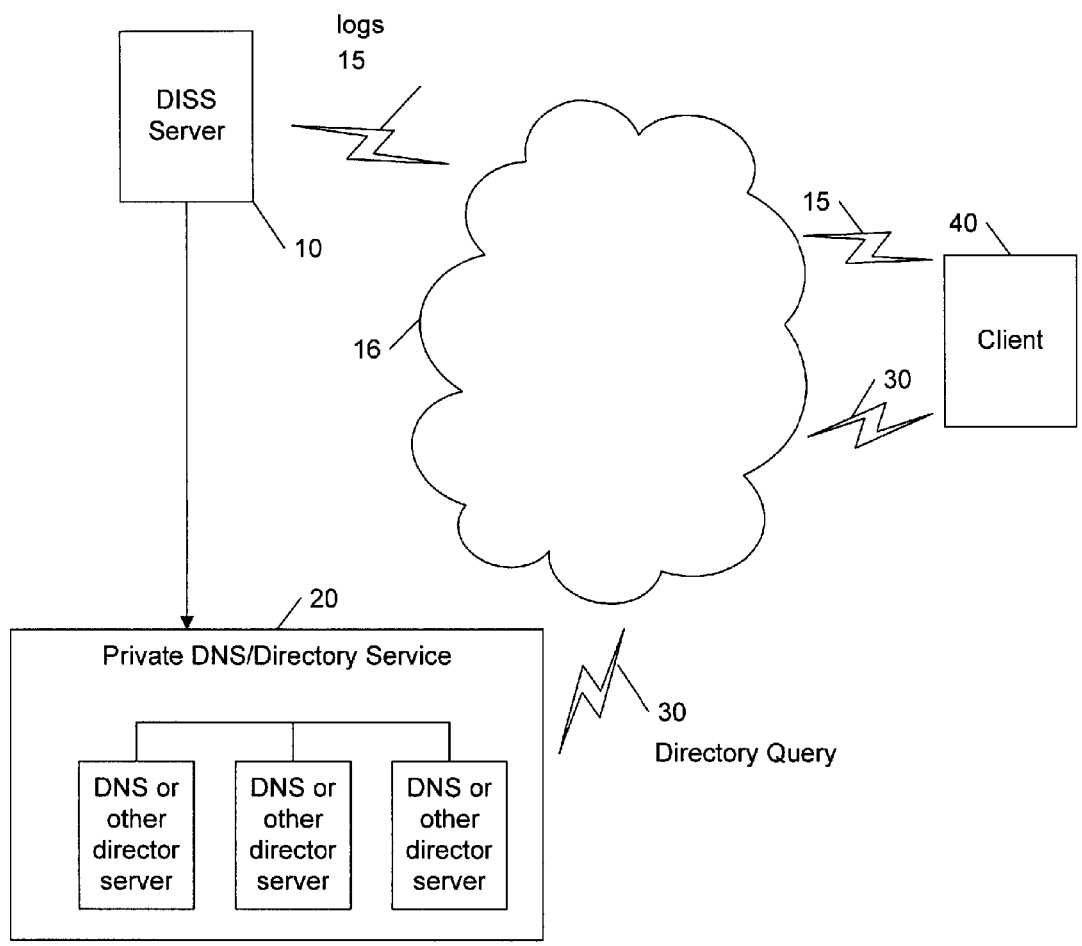
FIG. 5 is a block diagram of an exemplary system configured in accordance with aspects of the disclosure.

FIG. 5 is a block diagram of an exemplary system configured in accordance with aspects of the disclosure. In one embodiment of the system, a DISS server 10 acquires IP addresses and/or IP subnets from various sources and groups them by characteristic or reputation. The characteristic or reputation is based on at least one parameter relating to traffic to or from the at least one specific location in a network, where the parameters merit making traffic handling decisions. This process can be manual, automated via software or a combination of both. For example, the process can be automated through software that visits or crawls web pages that are known to list IP addresses and or IP subnets of spammers. Additionally, customers, subscribers or volunteers to the system can send in IP addresses and subnets via log transmission 15. Each list is then associated with a host name on one or more DNS or other directory servers, for example, private directory servers 20, with one or more connections to a network (e.g., the Internet). A request or directory query 30 received by the private directory servers 20 to resolve a host domain name will result in it being resolved to an associated list of IP addresses or subnets. The requests are received from clients 40 via the network 16 described in FIG. 1. The associated lists can then be propagated to clients or client elements (client/user device) 40 as host lookups in a directory service. The list propagation can also be accomplished using other protocols or systems that resolve names to IP addresses or IP Subnets.

Propagating a list of IP addresses/subnets associated with directory names through a standard name to address resolution where the addresses supplied are not the mapping of the name (e.g., a host name) in the normal sense allows the described systems and methods to make use of standard name to address resolution protocols and systems to achieve the delivery of a list of addresses. This allows users/client devices 40 to be easily programmed to take action(s) based on that name with the end result being that the action is taken for every address on the list.

In one example, a DNS server 20 is configured so that a selected name will resolve to selected (one or more) IP addresses and/or subnets when queried. This selected name can be a "fake" name in the sense that it is not being used in the typical manner for a name to address resolution. The DNS server 20 resolves the selected name to a list of selected IP addresses (e.g., a list of IP addresses to block) and not to one or more IP addresses associated with the selected name in the typical sense.

As an example, the service can propagate the top 10 attackers listed on, for example, a DShield web page, via a selected domain name, for example, dshield-top.diss.byrneit.net. In this example, DShield is an example of a community-based collaborative firewall log correlation system. It receives logs from volunteers world wide and uses them to analyze attack trends. On the DNS server 20 this selected domain name is a multi-A record in a DNS zone and the DNS server 20 returns the IP addresses of the top 10 attackers as currently reported by Dshield in response to a directory query for that selected domain name.

Network filtering and forwarding rules can be defined at the client device 40. The filtering and forwarding rules can be accomplished in, switches, routers, firewalls, load balancers, and other equipment generally indicated as network/client device 40 that use the selected names, instead of locally configured lists of IP addresses and subnets. The system can propagate highly dynamic lists of IP addresses and subnets, such as the current list of most active attackers, without requiring reconfiguration of equipment, or expensive and complex central management consoles. The system includes a list of selected names with each selected name having an associated list of IP addresses and subnets with certain characteristics. For example some of the selected names can have associated lists of addresses that a user would want to block and other selected names can have associated lists of addresses that a user would want to forward. The desired selected name or names are put in place of the traditional IP address and subnet mask, or address list entry, in the rule base. In one embodiment, an automated script on a workstation that is capable of resolving the IP addresses and turning them into rules on the network elements may be used.

In one embodiment the system propagates host records that are not the real names of the hosts, but that indicate their reputation or other characteristics that merit making traffic handling decisions on, and therefore allow network operators to use much simpler sets of rules, and little or no additional equipment, to manage dynamic lists of IP addresses. This can be used to solve the problem of configuring dynamic rules to meet dynamic network conditions, without the need for complex, expensive, and typically single-platform specific, management systems. The choice of DNS in one embodiment is due to its ubiquity, but the longer term view holds that any widely enough used directory system that resolves names to IP addresses can be used in this manner. Nor is the system limited to being used for blocking. Since all that is being propagated is characteristics of a given address or group of addresses, the system could just as easily be used for white listing, traffic prioritization, or other special handling (such as CALEA (Communications Assistance for Law Enforcement Act of 1994) wiretapping).

The system allows for automatic updates from a central point of all devices in the user network to control inbound and outbound connections to threat sources, for example. This relieves users of the effort required to react to evolving threats in a timely manner. Additionally, the implementation can require no special hardware or traffic re-routing and can be wholly managed through a web service.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Those of skill in the art will appreciate that the various illustrative system elements and method steps described in the figures and the embodiments and examples disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a system element or step is for ease of description. Specific functions can be moved from one element or step to another without departing from the invention.

A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Although the steps/operations of the method(s) herein are shown and described in a particular order, the order of the steps/operations of each method may be altered so that certain steps/operations may be performed in an inverse order or so that certain steps/operations may be performed, at least in part, concurrently with other operations. In another embodiment, instructions or sub-operations of distinct operations may be in an intermittent and/or alternating manner.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method comprising:
creating a network security policy to apply to network traffic, wherein a plurality of IP values are elements of the network security policy;
de-conflicting a current configuration against the plurality of IP values;
creating a protocol-specific list from the plurality of IP values using filters;
configuring a domain name system (DNS) server to resolve a DNS query to the network security policy;
receiving a name-to-IP value mapping request from a network device, wherein a name of the network security policy is a name for which name-to-IP value mapping is requested;
resolving the network security policy name to the plurality of IP values at the DNS server;
propagating the network security policy to the network device by transmitting the plurality of IP values to the network device in response to the name-to-IP value mapping request, thereby allowing the network device to utilize one or more of the plurality of IP values when applying network security to network traffic at the network device.

2. The method of claim 1, further comprising configuring an allow list or a deny list of the plurality of IP values, wherein the allow list contains IP values indicative of network traffic that should be allowed under the network security policy, and wherein the deny list contains IP values indicative of network traffic that should be denied under the network security policy.

3. The method of claim 1, further comprising configuring the network security policy at the DNS server with a record time to live, the record time to live functioning as a time period of validity for the network security policy.

4. The method of claim 1, further comprising:
creating the protocol-specific list from the plurality of IP values using filters based on needs derived from the de-conflicting.

5. The method of claim 1, wherein the network security policy involves blocking network traffic, and wherein network traffic having a source IP value or a destination IP value that references the one or more of the plurality of IP values is blocked.

6. The method of claim 1, wherein the network security policy involves prioritizing network traffic, and wherein network traffic having a source IP value or a destination IP value that references the one or more of the plurality of IP values is prioritized over other network traffic.

7. The method of claim 1, wherein the network security policy involves redirecting network traffic, and wherein network traffic having a source IP value or a destination IP value that references the one or more of the plurality of IP values is redirected.

8. The method of claim 1, wherein the network security policy involves inspecting network traffic, and wherein network traffic having a source IP value or a destination IP value that references the one or more of the plurality of IP values is inspected.

9. The method of claim 1, further comprising an acquisition server configured to acquire at least one of the plurality of IP values from a network security source on a network.

10. A system comprising:
a security server configured to:
create a network security policy to apply to network traffic, wherein a plurality of IP values conform to the network security policy;
de-conflict a current configuration against the plurality of IP values;
create a protocol-specific list from the plurality of IP values using filters;
a domain name system (DNS) server configured to resolve a network security policy name to the plurality of IP values that conform to the network security policy;
wherein, in operation, the DNS server:
receives a name-to-IP value mapping request from a network device, wherein the network security policy name is a name for which name-to-IP value mapping is requested;
resolves the network security policy name to the plurality of IP values at the DNS server;
propagates the network security policy to a network device by transmitting the plurality of IP values that conform to the network security policy to the network device in response to the name-to-IP value mapping request, thereby allowing the network device to utilize one or more of the plurality of IP values when applying network security to network traffic at the network device.

11. The system of claim 10, wherein, in operation, the security server:
creates the protocol-specific list from the plurality of IP values using filters based on needs derived from the de-conflicting.

12. The system of claim 10, further comprising a list server for configuring an allow list or a deny list of IP values, wherein the allow list contains IP values indicative of network traffic that should be allowed under the network security policy, and wherein the deny list contains IP values indicative of network traffic that should be denied under the network security policy.

13. The system of claim 10, further comprising an acquisition server configured to acquire at least one of the plurality of IP values from a network security source on a network.

14. The system of claim 10, wherein the security server is further configured to associate the network security policy with a record time to live, the record time to live functioning as a time period of validity for the network security policy.

15. The system of claim 10, wherein the network security policy involves blocking network traffic, and wherein network traffic having a source IP value or a destination IP value that references the one or more of the plurality of IP values is blocked.

16. The system of claim 10, wherein the network security policy involves prioritizing network traffic, and wherein network traffic having a source IP value or a destination IP value that references the one or more of the plurality of IP values is prioritized over other network traffic.

17. The system of claim 10, wherein the network security policy involves redirecting network traffic, and wherein network traffic having a source IP value or a destination IP value that references the one or more of the plurality of IP values is redirected.

18. The system of claim 10, wherein the network security policy involves inspecting network traffic, and wherein network traffic having a source IP value or a destination IP value that references the one or more of the plurality of IP values is inspected.

* * * * *